Feb. 10, 1942. G. SCHMIDT ET AL 2,272,646
APPARATUS FOR THE PRODUCTION OF PHOTOGRAPHIC PRINTING LIGHT
Filed Feb. 1, 1940 2 Sheets-Sheet 1

Gerhard Schmidt
Andreas Schilling
INVENTORS
BY
ATTORNEYS

Feb. 10, 1942.  G. SCHMIDT ET AL  2,272,646
APPARATUS FOR THE PRODUCTION OF PHOTOGRAPHIC PRINTING LIGHT
Filed Feb. 1, 1940  2 Sheets-Sheet 2
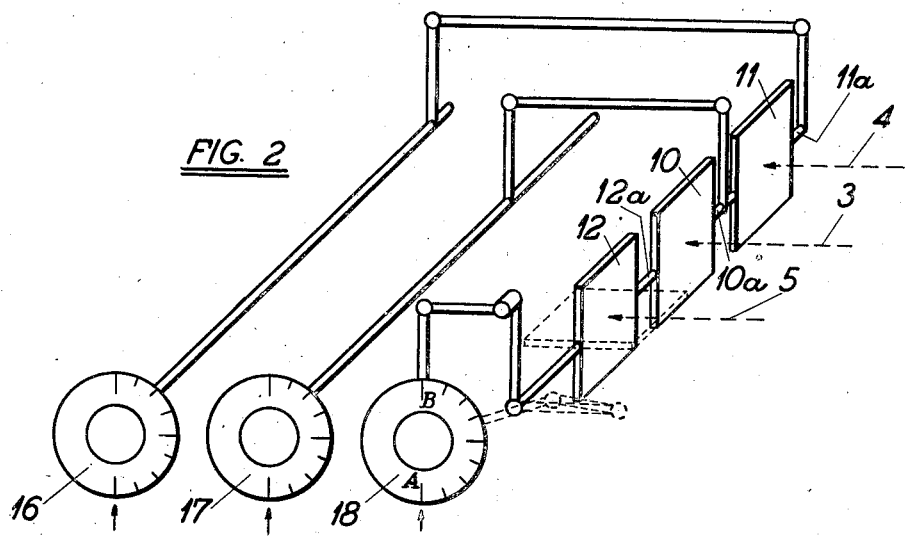
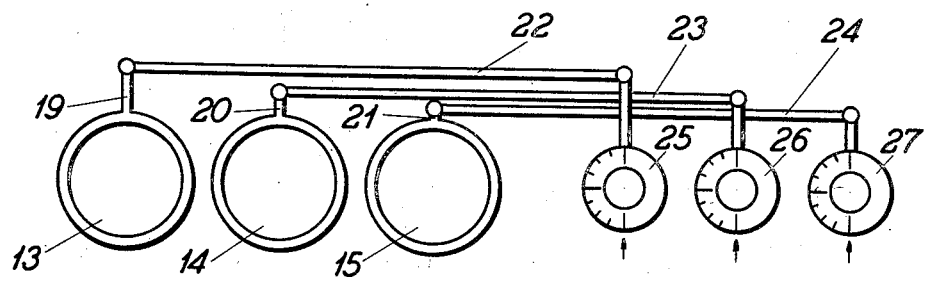
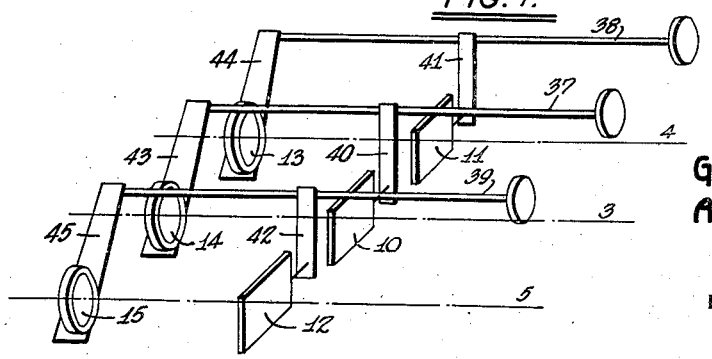
Gerhard Schmidt
Andreas Schilling
INVENTORS
BY
ATTORNEYS Patented Feb. 10, 1942

2,272,646

UNITED STATES PATENT OFFICE 2,272,646

APPARATUS FOR THE PRODUCTION OF PHOTOGRAPHIC PRINTING LIGHT

Gerhard Schmidt and Andreas Schilling, Dessau, Germany, assignors to General Aniline & Film Corporation, New York, N. Y., a corporation of Delaware Application February 1, 1940, Serial No. 316,712 In Germany February 2, 1939

1 Claim. (Cl. 95—73)

This invention relates to the production of photographic printing light. For the usual printing apparatus for photographic films, plates, papers etc. a light source is used which emits white or yellow-white light-beams consisting of most of the spectral colors. This light source may be varied by a resistance influencing the brightness of the lamp. The spectral displacement of the light, caused thereby, is irrelevant and depends chiefly on the age of the lamp, and is therefore not homogeneous and not reproducible. This fact however does not matter for the printing of black-white photographic materials.

On account of the progress in color-photography, a printing apparatus is nowadays required in which the color of the printing light is reproducibly variable. The simplest way would be to place filters, for instance graduated filters, in between the printing light and copying material. This method, however, is rather complicated as in a printing process it may happen that each scene has to be printed with a different color filter. Furthermore one could insert color screens between light source and film gate, for instance as described in French Patent 818,057, and could cover up the single colors of the screen with a corresponding black screen, so that the remaining colors act as filters. This way, though possible, seems unfavourable, since loss of light occurs by partly covering up the filters with black colors and since the possibility exists, that in some way or another an image of the screen is reproduced, thus causing unevenness of the picture.

Object of this invention is an apparatus which allows to influence the printing light in an easy way at will and automatically and which warrants an absolute uniformity and maximal light intensity.

In the drawings, which form a part of this application:

Figure 2 is a detail view of the coupling means for control of the filters;

Figure 3 is a detail view of the coupling means for control of the diaphragm;

Figure 4 is a detail view of means for coupling the diaphragms and filters.

Figure 1:
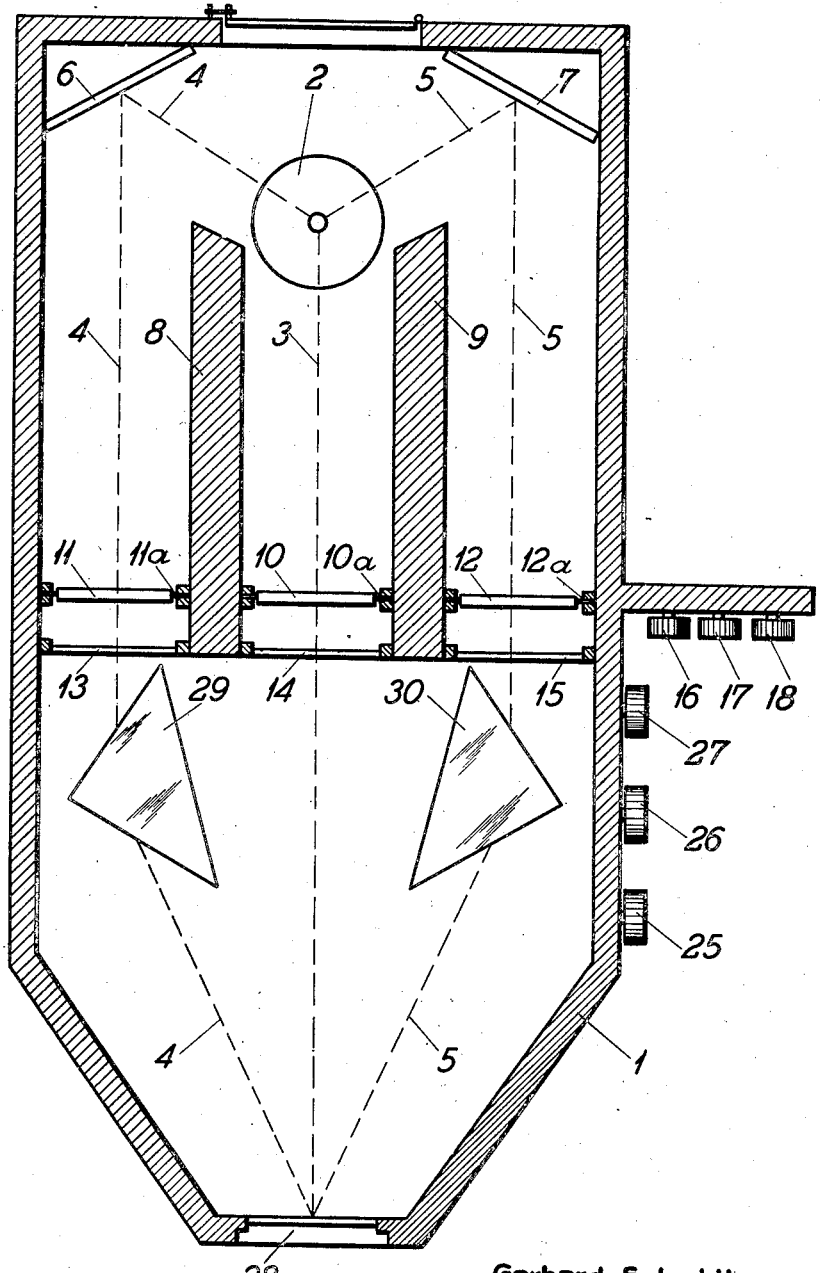
Figure 1 is a top view, partly in section, of one form of apparatus which embodies this invention.

Figure 1, in a light-tight housing 1 a lamp 2 is fixed emitting rays evenly in all directions. One light beam runs directly 3 and two light beams 4 and 5 indirectly, each over one mirror 6 and 7, which however may be replaced by prisms or similar means. The three light-beams are separated from each other by two walls 8 and 9, so that the single light source 2 supplies in the described way three independent light-beams.

Filters of different colors are inserted in these light-beams. Filter 10 is placed within the light-beam 3, the second filter 11 within the second light-beam 4 and the third filter 12 within a third light-beam 5. The filters, either round or of angular shape, are rotatively mounted round the middle axle 10a, 11a, 12a in such a way, that the light-beams penetrate the filters to a smaller or larger extent according to their angle of inclination with the light-beams.

The arrangement of these filters is illustrated in details in Figure 2. The arrows 3, 4, 5 represent the light-beams, Nos. 10, 11 and 12 the filters and 10a, 11a, 12a are the axles, on which the filters are rotatively mounted.

The filters 10, 11, and 12 are mounted on rods and can be rotated through 90 degrees. The rotation is controlled, through suitable connecting rods, by adjusting-knobs 16, 17, 18 on the outside of the housing. These knobs may be turned by hand.

When the adjusting-knob 18 takes up position A (see Figure 2), the filter lies completely within the light beam. Thus a relatively large proportion of said beam must pass through the filter. When the filter is rotated, the knob may be brought into position B, in which filter 12, after it has passed through all intermediate positions, is in a horizontal position and intercepts substantially none of the light in said beam. Similarly, the other two filters 10 and 11 are also adjustable.

In Figure 1 diaphragms 14, 13, 15 are provided in the path of the light-beams and allow a variation of the intensity of the single light-beams 3, 4, 5. These diaphragms are of such a construction to be shut completely, so that the intensity varies between zero value and a maximal value depending on the largest possible opening. The operation of these diaphragms is accomplished similarly to the filters 10, 11, 12 by knobs 25, 26, 27 placed outside of the housing 1.

Figure 3 illustrates the variable diaphragm-system. The diaphragms 13, 14, 15 are connected with the adjusting knobs 25, 26, 27 by pins 19, 20, 21 and rods 22, 23, 24. By turning these adjusting knobs the diaphragms may be completely opened or completely shut passing through all the intermediate stages.

Since the absolute brightness for the single light-beams differs with different filter-positions, the exposure time during the printing process should be altered by adjusting it in a suitable manner. This however is complicated and may be avoided, if filters 10, 11, 12 and diaphragms 13, 14, 15 are coupled with each other. As shown in Figure 4, filters 10, 11, and 12 are connected to control rods 37, 38, and 39 by interconnecting means 43, 44, and 45 respectively. Similarly, diaphragms 13, 14, and 15 are connected to rods 38, 37, and 39 by means 44, 43, and 45 respectively. Here the diaphragm, when the filter is moved to the horizontal position, narrows down a certain amount depending on the intensity of the filter, and opens again, when the filter is moved towards the upright position. The independent operation of the diaphragms 13, 14, 15 as described above, need not be altered.

The adjustment of brightness necessary as described above, may be accomplished also in another way. An additional graduated filter for instance or a filter graduated in steps (not shown in the drawings) may be placed in front of filter 10, 11, 12, which is rigidly coupled with the filter in such a way, that it goes into higher grey values, if the filter is in the horizontal position and towards a lower γ-value, if the filter is moved to the upright position.

By a suitable choice of these grey-filters it is possible, that at any filter position and at a definite position of the diaphragms 13, 14, 15 all three light-beams show the same absolute brightness or such a brightness which produces the same photographic effect on the printing material.

Figure 1 shows further, that light-beam 3 is thrown directly to the film gate 28. The two lateral light-beams 4 and 5 are directed by prisms 29, 30, which may be replaced by mirrors in such a way, that they are also thrown towards the film gate 28. The prisms or mirrors may be movably mounted in order to adjust them. The distance between the diaphragms and the film gate must be chosen in such a way, that the film gate is uniformly lighted by all three light-beams. By such a mixture or different light-beams, variable in the described manner as to color and intensity, a light of every desired composition may be produced at the light gate, complying with all requirements of the printing process, especially with color material.

The present invention is not limited to three light-beams, but is also applicable to apparatus with only two or more than three light-beams, which in an analogous way are variable as far as color and intensity are concerned.

We claim:

Apparatus for providing printing light which comprises a light source, a printing window, optical means dividing the light emitted by said source into at least two separate beams, additional optical means for directing said beams to said printing window to form a single printing light of controllable spectral composition and intensity, a color filter in the path of at least one of said beams, said filter being adjustable for intercepting any desired proportion of the light rays in the given beam, an adjustable diaphragm in the path of each beam which is filtered, and compensating means coupling said diaphragm with its corresponding filter for decreasing the portion of said beam transmitted by said diaphragm when said filter intercepts a small proportion of said beam and for increasing the portion of the beam transmitted by the diaphragm when the filter intercepts a larger proportion of said beam.

GERHARD SCHMIDT.
ANDREAS SCHILLING.